(12) United States Patent
Ball

(10) Patent No.: US 6,457,501 B1
(45) Date of Patent: Oct. 1, 2002

(54) TIRE AND RIM ASSEMBLY

(75) Inventor: Graham Stanley Ball, Staffordshire (GB)

(73) Assignee: The Goodyear Tire & Rubber Company, Akron, OH (US)

( * ) Notice: Subject to any disclaimer, the term of this patent is extended or adjusted under 35 U.S.C. 154(b) by 0 days.

(21) Appl. No.: 09/787,703

(22) PCT Filed: Nov. 2, 1998

(86) PCT No.: PCT/US98/23315

§ 371 (c)(1),
(2), (4) Date: Mar. 20, 2001

(87) PCT Pub. No.: WO00/26039

PCT Pub. Date: May 11, 2000

(51) Int. Cl.[7] .............................................. B60B 21/04
(52) U.S. Cl. ................... 152/379.3; 152/381.4; 301/95.101
(58) Field of Search ................... 301/95.101; 152/379.3, 152/379.4, 379.5, 381.3, 381.4, 382, 383

(56) References Cited

U.S. PATENT DOCUMENTS 2,126,223 A * 8/1938 Schwinn ................ 301/95.101
3,910,336 A 10/1975 Boileau .................... 152/379.3
4,351,382 A * 9/1982 Corner et al. ......... 152/381.4 X
4,824,177 A * 4/1989 Aloy ............................ 301/58

FOREIGN PATENT DOCUMENTS

| DK | 4006374 | 9/1991 |
|----|---------|--------|
| EP | 0278615 | 8/1988 |
| EP | 0754572 | 1/1997 |
| EP | 0832761 A2 * | 4/1998 |
| WO | 9718097 | 5/1997 |

OTHER PUBLICATIONS

International Standard 5775–2; Bicycle tire and rims—Part 2: Rims; ISO (International Organization for Stanndardization); Second Edition, Dec. 1, 1996.*

* cited by examiner

Primary Examiner—Russell D. Stormer
(74) Attorney, Agent, or Firm—David L. King

(57) ABSTRACT

A tire rim (1, 40, 60) having a reduced flange height (h) is disclosed. The rim (1, 40, 60) has one or both flanges (2, 42, 62) having a maximum radial height (h) of less than 12 mm, preferably in the range of 6 mm to less than 12 mm. The rim (1, 40, 60) when combined with a tire (10) has a tire and rim assembly wherein the bead core (22) of the tire (10) has a centroid (24) that is within 3 mm of the maximum radial height (h) of the rim flange (2) preferably within 1 mm.

13 Claims, 5 Drawing Sheets

TIRE AND RIM ASSEMBLY

TECHNICAL FIELD

This invention relates to pneumatic tires and rim. More specifically, the invention relates to a modified rim for automobiles and light trucks. The rim having a 5° drop center profile and a unique flange.

BACKGROUND OF THE INVENTION

Over the years, the tubeless pneumatic tire and its associated rim have been designed to make an efficient wheel assembly. The rim provides a means to attach the wheel to the vehicle; it provides a space to locate and attach the brake assembly and finally and foremost, it provides a bead seat and rim flange designed to accept a tire and to secure that tire creating an air-tight seal between the rim and the tire.

The combination of the tire and the rim flange also provides a surface to attach leaded balancing weights to reduce rim and tire vibration due to out of balance conditions.

The rim is a most efficient mechanical structure performing all of the functions described above in one well engineered structure.

The rim has evolved over the years from a cold, rolled steel structure to highly engineered cast magnesium or aluminum structure of very light weight.

The tire engineer has rarely been a significant contributor to the evolution of the rim. Radical and usually complex rims have been suggested by various tire companies to solve a difficult problem in the tire.

Almost universally, these rim solutions meet with failure and very poor market acceptance.

The early evolution of so-called safety tires and runflat tires all have suggested designing a special rim and tire combination. Experience dictates that the tire engineer preferably should solve his or her tire related problems within the standards already established in the United States, Europe and Japan.

Nevertheless, slight deviations from the proven standards has led to some remarkable benefits.

Jacques Boileau of Michelin disclosed in U.S. Pat. No. 3,910,336 that low aspect ratio radial tires could be designed and molded wherein the carcass reinforcement could follow a neutral ply line if the standard rim flange did not interfere. He suggested that the conical edges of the rim should be located above the bead core, however, the edge in accordance to the invention is generally less high seen in the radial section than a conventional rim. Boileau further teaches that, for these rim edge flanges to achieve the desired contoured, they should be inclined between 20° and 60° preferably close to 45° to give the desired results.

Boileau's rim in combination with a tire molded with a specified cord ply path that was neutral yields improved ride and comfort.

Nevertheless, the radially outer portion of the rim flange was designed to be above the tire bead core and in contact with the bead portion of the tire. This was necessarily, or at least considered necessary in part, due to the use of a light weight round cable bead core which increased the flexibility of the tire in the bead region.

In European Patent Application 0 278 615, assigned to S P Tyres UK Limited, a conventional rim flange was modified by providing one retaining flange of reduced height along a portion of the flange extending a length of 0.25 to 0.5 times the bead seat circumference. The assembly provided a wheel rim having much increased break space inside the wheel rim.

The present invention utilized a unique rim that has no portion of rim extending above the radially outermost portion of the bead core of the tire.

It is an object of the present invention to provide a 5° bead seat rim with a reduced radial height rim flange that will not contact the tire at any location above the bead core during any driving conditions.

It is a further objective that the rim flange securely restrains the beads laterally without contributing any radial input to the tire.

It is a further object of the invention to provide a modified rim for low aspect ratio tires of 65% or less of any ply path wherein the rim flange cannot adversely input the ride and handling performance of the tire.

SUMMARY OF THE INVENTION

A tire rim (1, 40, 60) has an axially inboard and an axially outboard end, a pair of annular flanges (2, 42, 62) at both axial ends, respectively a pair of bead seats (3) axially inwardly extending from the flanges (2, 42, 62). The rim (1, 40, 60) has a reduced diameter central portion (4) between the opposing bead seats (3). A bead hump (5, 6) is adjacent each bead seat (3). One inclined surface (8) extends between the reduced diameter central portion (4) and the bead hump (5, 6) nearest the annular flange (2, 42, 62) located adjacent the axially outboard side.

The tire rim is (1, 40, 60) characterized by each annular flange (2, 42, 62) having a maximum radial height (h) less than 12 mm, preferably in the range of 6 mm to less than 12 m, most preferably about 9 mm.

In one embodiment the annular flanges (2) have an almost vertical axially innermost surface (32) extending generally from above the bead seat (3) to just below the radially outermost portion (30) of the respective rim (1) flange (2) defining the maximum radial height (h).

In an alternative embodiment (40), the axially innermost surface (52) of the rim flange (42) is inclined axially and radially outwardly at an angle greater than 60° relative to the rim's axis.

The rim (1, 40, 60), when used in combination with a tire (10), forms a tire and rim assembly wherein the tire (10) has tread portion (12), a tread reinforcement (14) in the tread portion (12), a pair of sidewalls (16) respectively on opposite sides of the tread portion (12), a pair of beads (20) respective at the radially inner edges of the sidewalls (16), a bead core (22) respectively in each of the beads (20) and a carcass reinforcement (18) having cords (19) that are radially extending, the tire (10) having an aspect ratio of less than 65%.

The rim (1, 40, 60) correspondingly has an axially inboard and an axially outboard end, a pair of annular flanges (2, 42, 62) at both axial ends, respectively a pair of bead seats (3) axially inwardly extending from the flanges (2, 42, 62). The rim (1, 40, 60) has a reduced diameter central portion (4) between the opposing bead seats (3). A bead hump (5, 6) is adjacent each bead seat (3). One inclined surface (8) extends between the reduced diameter central portion (4) and the bead hump (5, 6) nearest the annular flange (2, 42, 62) located adjacent the axially outboard side.

The tire (10) and rim (1, 40, 60) assembly is characterized in that each annular flange (2, 42, 62) of the rim (1, 40, 60) has a maximum radial height (h), (h) being less than 12 mm and each bead core (22) has a cross-sectional area having a centroid (24) located radially less than 12 mm from the bead seat (3), preferably the centroid (24) is located 9 mm or less from the bead seat (3). The maximum radial height (h) of the flange (2, 42, 62) is preferably within 3 mm of the radial location of the bead core (22), most preferably within 1 mm.

DEFINITIONS

"Aspect Ratio" means the ratio of a tire's section height to its section width.

"Axial" and "axially" means the lines or directions that are parallel to the axis of rotation of the tire.

"Bead means that part of the tire comprising an annular tensile member wrapped by ply cords and shaped, with or without other reinforcement elements such as flippers, chippers, apexes, toe guards and chafers, to fit the design rim.

"Belt Structure" or "Reinforcing Belts" means at least two annular layers or plies of parallel cords, woven or unwoven, underlying the tread, unanchored to the bead, and having both left and right cord angles in the range from 17° to 27° with respect to the equatorial plane of the tire.

"Circumferential" means lines or directions extending along the perimeter of the surface of the annular tread perpendicular to the axial direction.

"Carcass" means the tire structure apart from the belt structure, tread, undertread, and sidewall rubber over the plies, but including the beads.

"Cord" means one of the reinforcement strands of which the plies in the tire are comprised.

"Equatorial Plane (EP)" means the plane perpendicular to the tire's axis of rotation and passing through the center of its tread.

"Normal Inflation Pressure" means the specific design inflation pressure and load assigned by the appropriate standards organization for the service condition for the tire.

"Normal Load" means the specific load assigned by the appropriate standards organization for the service condition for the tire.

"Ply" means a continuous layer of rubber-coated parallel cords.

"Radial" and "radially" means directions radially toward or away from the axis of rotation of the tire.

"Radial Ply Tire" means a belted or circumferentially-restricted pneumatic tire in which the ply cords which extend from bead to bead are laid at cord angles between 65° and 90° with respect to the equatorial plane of the tire.

"Section Height" means the radial distance from the nominal rim diameter to the outer diameter of the tire at is equatorial plane.

"Section Width" means the maximum linear distance parallel to the axis of the tire and between the exterior of its sidewalls when and after it has been inflated at normal pressure for 24 hours, but unloaded, excluding elevations of the sidewalls due to labeling, decoration or protective bands.

"Shoulder" means the upper portion of sidewall just below the tread edge.

"Sidewall" means that portion of a tire between the tread and the bead.

DETAILED DESCRIPTION OF THE INVENTION

Figure 1:
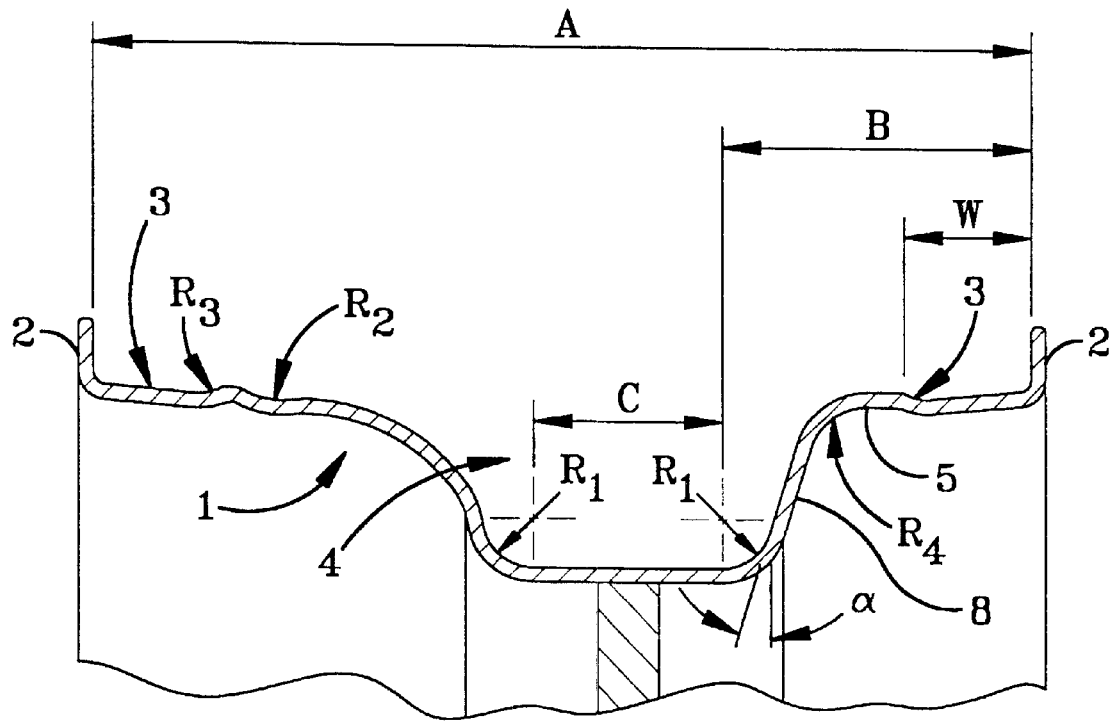
FIG. 1 is a cross-sectional profile of a 5° drop center rim contour for automobile and light trucks according to the invention.
Figure 1A:
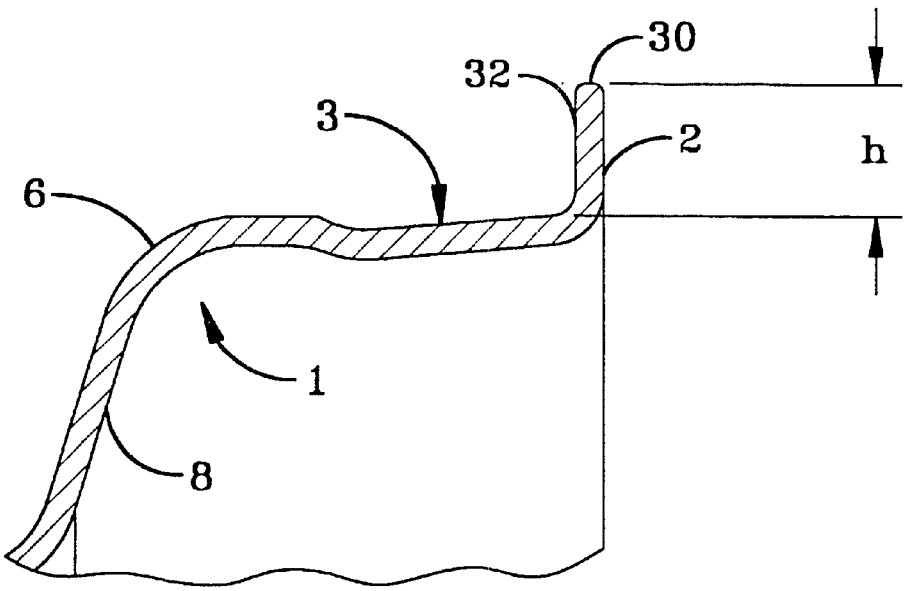
FIG. 1A is an enlarged portion of the rim profile of the outboard side flange area of FIG. 1.

With reference to FIGS. 1 and 1A, there is shown a profile of the inventive 5° drop center rim (1) for passenger and light truck vehicles. The rim (1) has a pair of axially spaced rim flanges (2). The flanges (2) are spaced a distance (A). Each flange extends radially outwardly from a bead seat (3); the bead seat has an inclined surface relative to the rim's axis, the bead seat has an inclined surface relative to the rim's axis, the inclination being 5°. Axially inward of each bead seat is a bead hump (5) or (6). In FIG. 1 bead hump (5) is commonly referred to as a "flat hump" while in FIG. 1A a rounded hump (6) is shown. These humps (5) or (6) form an annular ridge that help keep the tire seated onto the bead seat by creating an obstruction to axially inward movement of the tire bead when the tire is operated without being inflated. Under normal inflated driving conditions, the tire is pushed axially outwardly against the flanges (2) while the radially inner surface of the tire's bead commonly referred to as the "toe" seals airtightly against the inclined bead seat (3).

The tire designer must design the tire bead to have a diametral interference fit with the bead seat. The radially inner portion of the tire bead is generally elastomeric and conformable to the inclined bead seat, upon assembly the bead is both deformed and compressed by the tire's bead core and the bead seat of the rim.

For the deformation and compression to occur, the bead of the tire must first slide radially and axially outwardly along the inclined surface (8) and over the bead humps (5) or (6).

The industry standard rims (1) specified that the inclined surface (8) must have a minimum inclination of 10° off vertical. Typically, the inclination is about 69° or more relative to the rim's axis of rotation on the outboard side of the vehicle.

Tire rims have a diametrically depressed central portion (4) that facilitates the tire mounting procedure. Those skilled in the art commonly referred to this central portion (4) as a "wheel well". The wheel well is generally and preferably located closer to the outboard side of the rim. This means that the outboard bead seat and flange are generally axially closer to the mounting holes of the rim while the inboard side of the rim seat and flange are cantilevered axially inward from the mounting holes.

Ideally, the wheel well (4) has an axial width (C). In the space between the wheel well (4) and the axially inboard side of the rim (1), both the brake and disk caliper assembly are located. The rim manufacturers try to maximize the space between the wheel well and the inboard flange to accommodate the brakes.

The commonly manufactured rims all generally transition from the various functional surfaces by employing generous radii R1, R2, R3 and R4. These radii reduce the stress risers that occur with sharp cornered machined surfaces. The inventive rim (1) of FIG. 1 similarly preferably employs the generous radii R1, R2, R3 and R4.

As shown in FIG. 1, the bead seat has an axial width (W) extending between the bead hump and the flange. The axially outboard flange is spaced a distance (B) from the wheel well (4) as shown.

As further illustrated in FIGS. 1 and 1A, the rim flanges 2 are shown extending substantially vertically from the bead seat (3) to a radially outer surface (30). The distance or maximum radial height of the rim flange above the bead seat (3) is defined as (h). In each of the embodiments disclosed, it is believed very important that no portion of the rim flange should extend radially above the height (h). Applicant has contemplated that convex radially outer flanges or even axially outwardly extending rim stiffening features commonly used in rim manufacturing may be used, however, none of these extensions, if used, should extend above the dimension (h). Unlike the prior art disclosure of Boileau in his U.S. Pat. No. 3,910,336, applicant had discovered that when such features are employed as a means to stiffen the rim, the flange contacts the lower sidewall bead when it extends above the height (h) influencing the ride and handling characteristics of the vehicle. In such a case where the rim flange contacts the bead radially above the bead core, the rim flange stiffens that portion of the tire. In high aspect ratio tires having proportionally taller sidewalls, this influence of the rim flange contacting the tire above the bead cores is almost not noticeable. The sidewalls are sufficiently compliant to maintain a very soft luxurious ride. However, in low aspect ratio tires of 65 aspect ratio or less, the rim flange can contact the tire in cornering maneuvers and as the tire rolls over road bumps. When the tire compresses or deforms under these dynamic inputs, it transfers an increasing but generally smooth spring-like reaction to the passengers and driver. When the tire suddenly contacts the rim flange, this smooth spring-like resistance to the maneuver or the obstruction on the road suddenly jolts the driver and the passenger creating a more harsh solid impact phenomenon. In high performance vehicles which employ a stiffer suspension in order to get the most steering response, this impacting of the rim flanges against the tire can become fatiguing to a driver. The tire designer must provide a tire that can perform up to the capabilities of the vehicle. In very high performance vehicles, the resultant tire is generally very stiff and has a relatively high spring rate when inflated due in part to the very low sidewalls and the overall carcass and tread reinforcement structure. The inventor has discovered that when a tire is mounted on a rim wherein the rim flange is deliberately designed to avoid radial force inputs to the tire a smoother spring-like response of the tire is assured.

To test this theory, the inventor elected to evaluate this concept in the rigors of Formula 1 racing. In this type of racing, the steering and corning maneuvers are tested to an extreme. The driver at the end of a race is usually exhausted due to the rigors of the race. The inventor utilized the control racing tires without any modifications and mounted these tires on the racing rims which had both flanges (2) cut the maximum radial height (h) of 9 mm. Initial tests indicated that the front tires had much more grip and the driver could lean on the tires more particularly in the faster corners. The drivers also positively noted that better turn-in in the sharper, slower corners was achieved. The negative aspects were that the front tires benefited more, giving more grip than the rear tires resulting in a somewhat unbalanced the vehicle which required a suspension correction and the car wandered more under braking. Overall, the evaluation in Formula 1 racing demonstrated that the lower point of sidewall flex yielded improved ride qualities, better handling and vehicle performance. A primary aspect of these improvements were achieved with the tire and mold shape as it already existed. The inventor noted that the inventive rim profile allows the design to take a natural shape lower sidewall ply line which will improve tire stability, performance, and durability without the influences of the rim flange.

Another important aspect of the claimed invention is that tire mounting is achieved. The lowered flange (2) enables the tire to be mounted with very little force almost eliminating the need for mounting tools. This means there is far less likelihood of bead damage on fitment.

Figure 2:
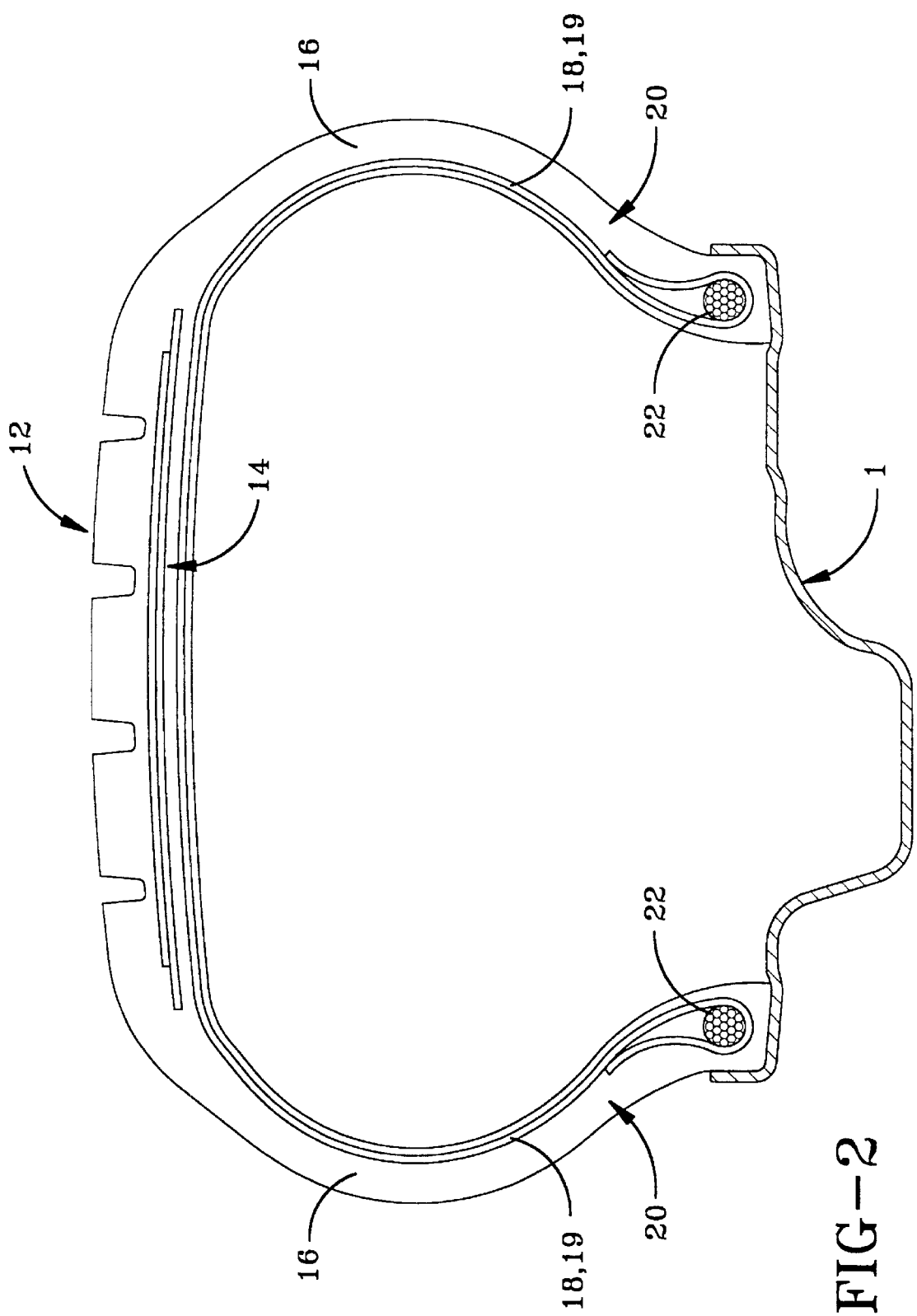
FIG. 2 is a cross-sectional view of a tire and rim assembly according to the present invention.

With reference to FIG. 2, a tire (10) having an aspect ratio of 65% or less is shown. The tire (10) has a tread portion (12), a tread reinforcement (14) in the tread portion (12) a pair of sidewall portions (16) respectively on opposite sides of the tread portion (12) a pair of bead portions (20) respectively at the radially inner edges of the sidewall (16), a bead core (22) respectively in each of the beads (20) and a carcass reinforcement (18) having cords (19) that are radially extending.

Figure 3:
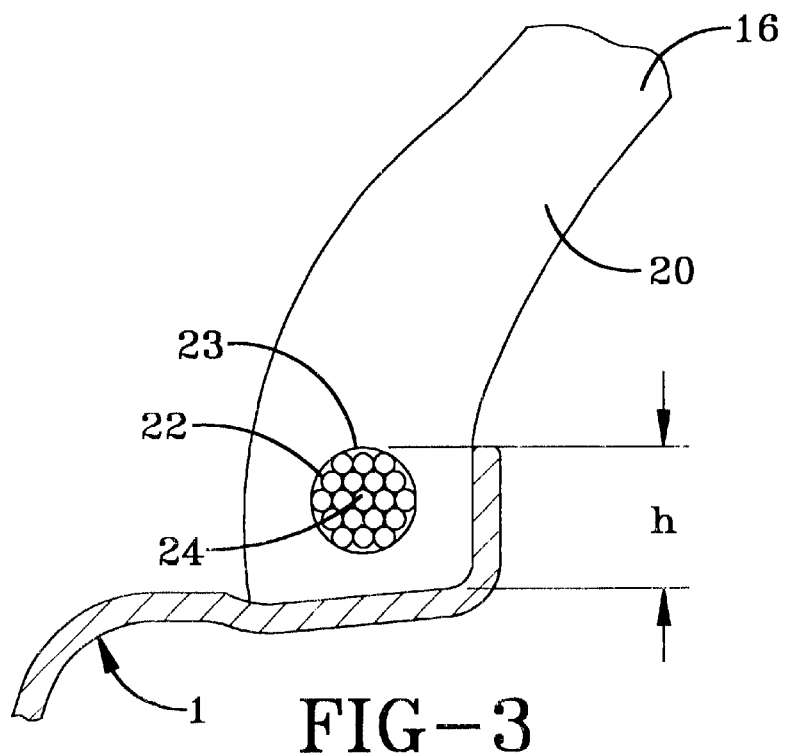
FIG. 3 is an enlarged cross-sectional profile of the rim profile outboard side flange and tire bead portion having a circular bead core.
Figure 4:
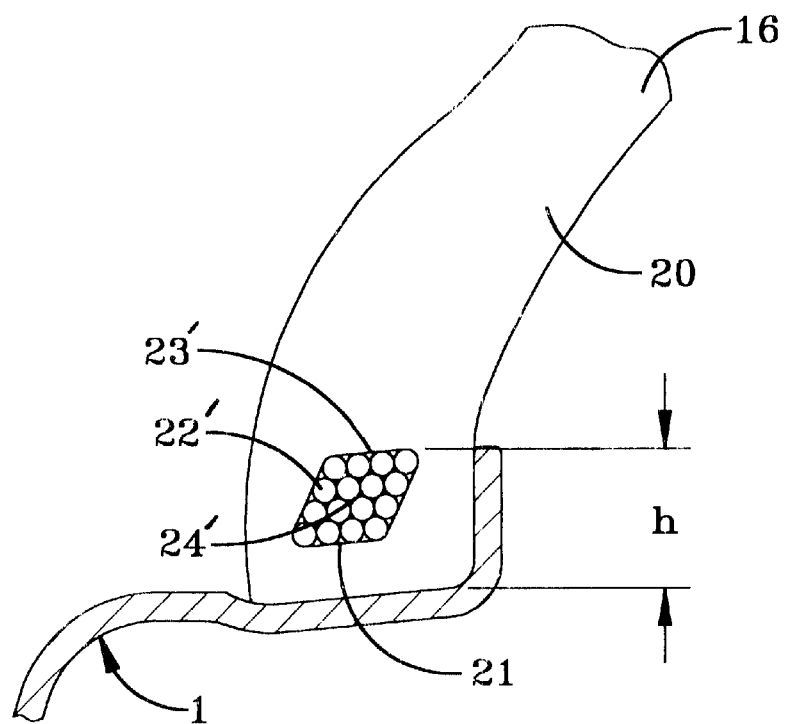
FIG. 4 is an enlarged cross-sectional profile of the rim profile outboard side flange of the rim and a tire bead portion having a polygonale.

As shown in FIGS. 3 and 4, the bead core (22) can be round or circular as is common in a cable type bead core or the bead core can be of a polygonal shape as a square, rectangle, hexagon, or even triangular formed by multiple layers of wire filaments formed by one or more strands of wire. Preferably, the bead core (20) has a flat base (21), the flat base (21) being horizontal or inclined slightly relative to the tire's axis so that the axially outer portion is radially outward of the axially inner portion of the bead core (22). The benefits of the flat base type bead core will be discussed later. For the invention to achieve the desired results, the bead core (22) should have a radial outermost surface (23) that extends at least equal to but preferably above the location (h) of the rim flange (2) as shown in FIGS. 3 and 4. The rim flange height (h) is preferably less than 12 mm, most preferably about 9 mm.

Each bead core (22) when viewed cross-section has a centroid (24), the centroid being at the geometric center of the bead core. It is believed that the centroid should be less than 3 mm radially outward the height (h) of the rim flange in the case of a flat base bead core, more preferably less than 1 mm above the rim. This relationship insures that the mass center of the bead is securely constrained laterally by the flanges (2).

Figure 5:
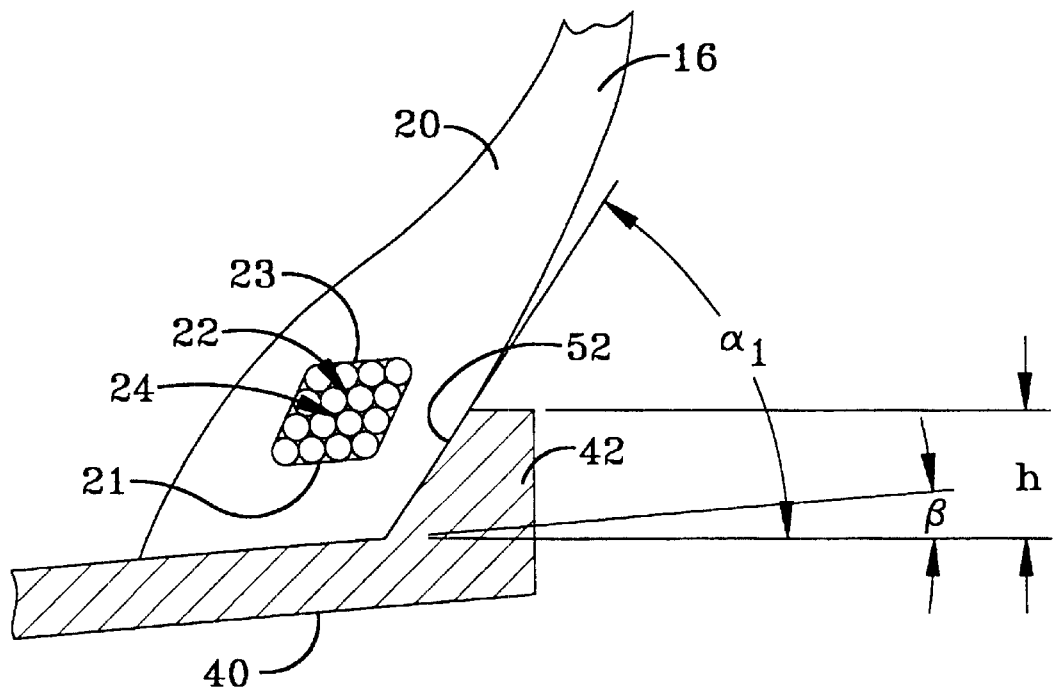
FIG. 5 is an enlarged cross-sectional view of the tire and rim assembly showing a first alternative rim flange.
Figure 6:
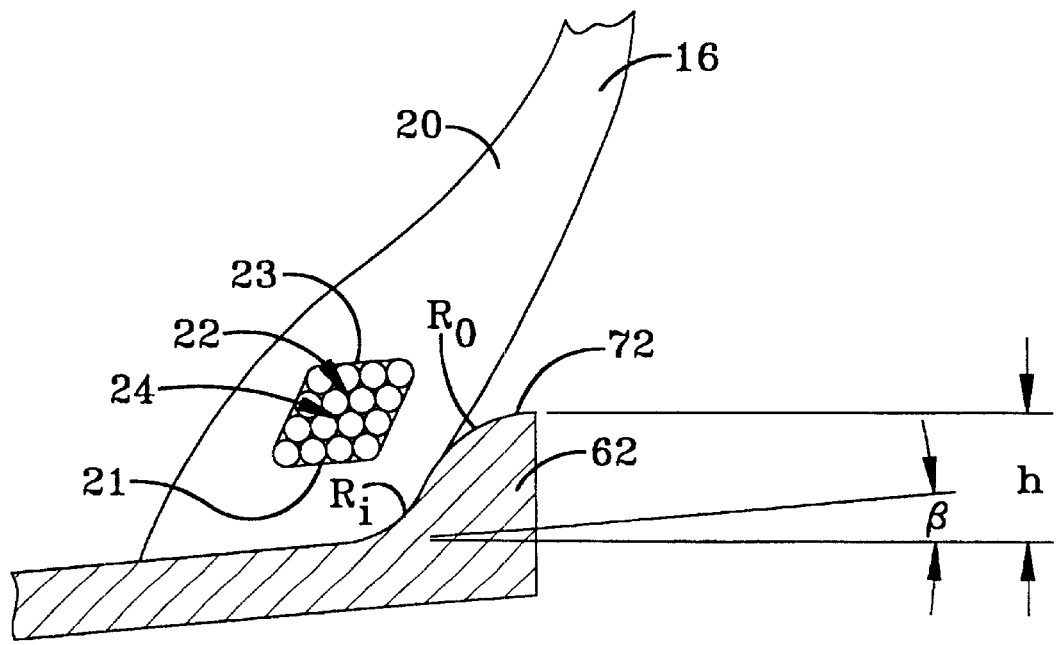
FIG. 6 is an enlarged cross-sectional view of a tire and rim assembly showing a second alternative embodiment rim flange.

In FIGS. 5 and 6, this relationship of having the centroid of the bead core located near the height (h) of the rim is shown.

With reference to FIG. 5, a portion of a first alternative embodiment rim (40) is shown. The rim (40) has all the previous mentioned features of rim (1), however, the rim flange (42) has an inclined surface (52), the inclined surface is preferably oriented at an angle 1 of greater than 60° relative to the rim's axis. This rim also has the bead seat angle of about 5°.

With reference to FIG. 6, a portion of a second alternative embodiment rim (60) is shown. The rim (60) has all the previous mentioned features of rims (1) and (40) except the rim flange axially innermost surface is formed by two radii of curvature Ri and Ro. Ri is preferably about 6 mm while Ro is about 9 mm and terminates at the radial location (h).

The alternative first and second embodiments illustrate that the flange may take several distinct shapes to further enhance tire performance or increase the rim's durability and strength without interfering with the lower sidewall flexibility of the tire (10).

Additionally as previously disclosed, the rim flanges (2, 42, 62) can be made thicker or thinner depending on strength requirements. The flange can further stiffen by having axially outwardly extending curve or straight extensions as is common in conventional rims, however, these extensions should not extend radially above the location (h).

One of ordinary skill in the tire art will quickly appreciate that the lowering of the flange height (h), while providing excellent tire performance improvements, greatly reduces the surface contact area of the rim flange (2) relative to the tire (10). This reduced contact area means that upon severe acceleration or braking the tire (10) may slip on the rim. For this reason, the inventor believes that round or cable-type beads are much less desirable than the flat base type bead cores. Recent developments in runflat tires has shown that properly designed bead cores having a flat base can actually be retained on the rim without air inflation forcing the tire against the flange. These tires (10) generally fit very tightly against the rim seat and the bead heel portion of the flanges because the base side of the bead core has a very wide axial width. This axial width of the bead core (22) is about 100% to as small as 75% of the bead seat width (W) of the rim while the inextensible bead core has a base width of 85% to greater than 50%, preferably about 85% to 65% of the bead seat width (W). As can be easily appreciated, a round bead core simply generates much less surface pressure on an area of sufficient size to provide adequate bead retention under these severe runflat conditions.

The inventor's employer, The Goodyear Tire & Rubber Company, has projected that most vehicles will in the future have a limited runflat capability. This being the case, the present invention rim (1, 40, 60) have a high likelihood of being used with runflat tires.

Figure 7:
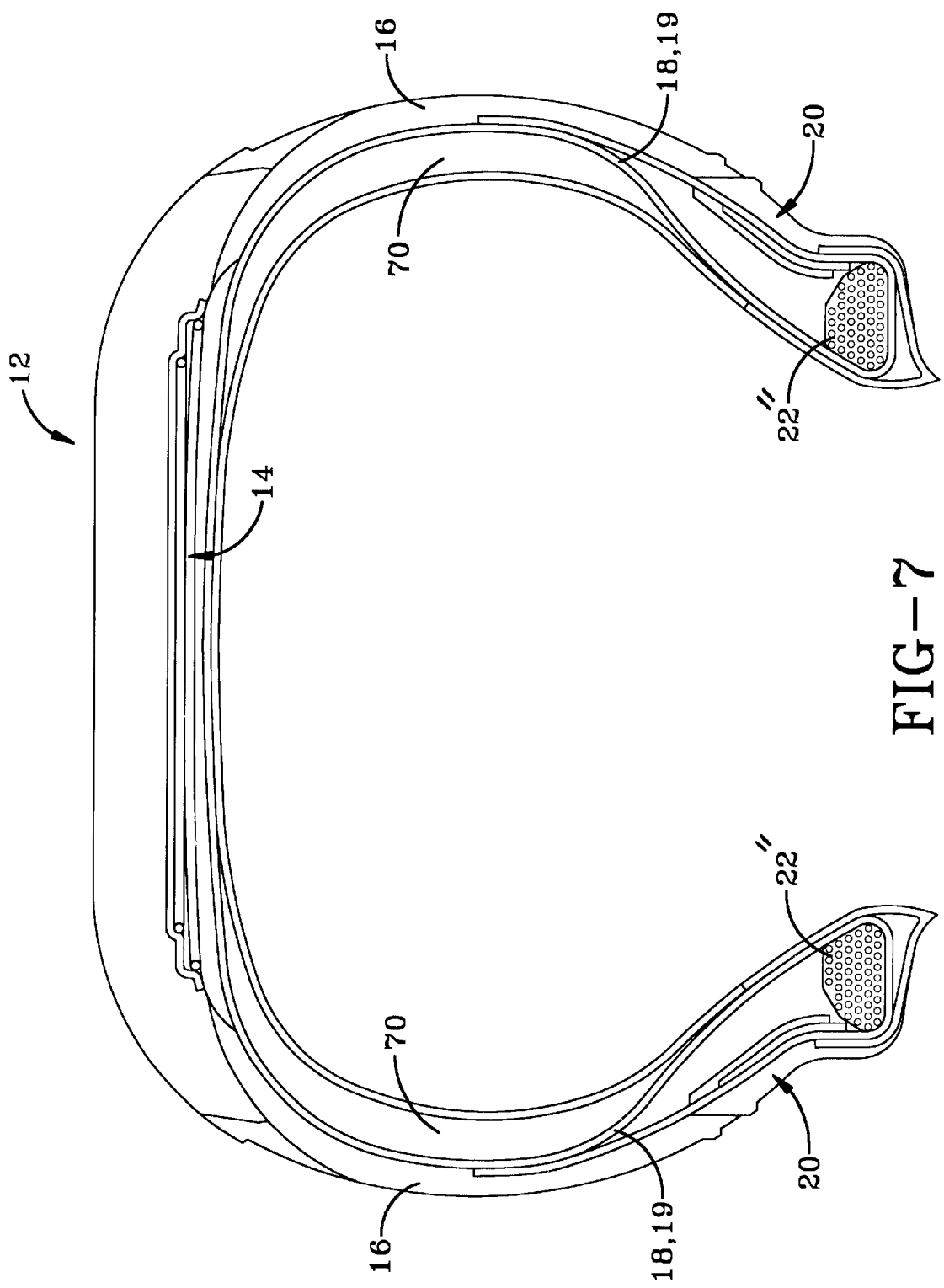
FIG. 7 is a cross-sectional view of a runflat tire.

It is clear that runflat tires can be made of low aspect ratios. These tires are commercially available now. What is more difficult is developing runflat tires having the same ride characteristics of convention pneumatic higher aspect ratio tires. The present invention rims (1, 40, 60) are a great step forward in providing that solution. The rims (1, 40, 60) when used with an already stiffened sidewall runflat tire will enable the tire to be designed to soften the ride characteristics for handling and driving comfort without loosing any runflat capability. This ride turning capability will permit the tire engineer to further reduce the tire sidewall without sacrificing ride performance. FIG. 7 Shows a typical runflat tire (10) construction having one or more inserts (70) in each sidewall (16) for use in combination with the inventive tire rim.

As has been disclosed, the present inventive tire and rim assembly has both rim flanges (2) of a reduced height. It is understood that in oval track racing as is "Indy car racing" only the one flange (2) would be needed to be lowered in such a case the flanges nearest the infield of the track would play less of a roll in the tire's performance; therefore, it is contemplated that a specialized rim having only one flange modified as disclosed is also within the scope of the present invention wherein the rims when mounted on the vehicle would have the one flange (2) on each rim (1) of the vehicle closest to the outside of the track modified to the reduced maximum radial height (h).

What is claimed is:

1. A light truck or automobile tire rim having an axially inboard end and an axially outboard end having an annular flange at both axial ends, respectively, a pair of bead seats axially inwardly extending from the flanges, a reduced diameter central portion between the opposing bead seats, a pair of bead humps, one hump being adjacent each bead seat and one inclined surface extending between the reduced diameter central portion and the bead hump nearest the annular flange located adjacent the axially outboard side, the tire rim comprising one annular flange at either the axially outboard end or the axially inboard end having a maximum radial height (h) being less than 12 mm as measured from the bead seat and no portion of the rim flange extends radially above said height (h).

2. A light truck or automobile tire rim having an axially inboard end and an axially outboard end having an annular flange at both axial ends, respectively, a pair of bead seats axially inwardly extending from the flanges, a reduced diameter central portion between the opposing bead seats, a pair of bead humps, one hump being adjacent each bead seat, and one inclined surface extending between the reduced diameter central portion and the bead hump nearest the annular flange located adjacent the axially outboard side, the tire rim has each annular flange comprising maximum radial height (h), the maximum radial height (h) being less than 12 mm as measured from the bead seat.

3. The light truck or automobile tire rim of claim 2 wherein each rim flange has a maximum radial height (h), (h) being in the range of 6 mm to less than 12 mm as measured from the bead seat.

4. The light truck or automobile tire rim of claim 3 wherein each annular flange has a maximum radial height (h), (h) being about 9 m.

5. The light truck or automobile tire rim of claim 2 wherein each annular flange has an axially innermost surface that is substantially vertically extending from near the bead seat radially outwardly toward the maximum radial height (h).

6. A light truck or automobile tire rim having an axially inboard end and an axially outboard end having an annular flange at both axial ends, respectively, a pair of bead seats axially inwardly extending from the flanges, a reduced diameter central portion between the opposing bead seats, a pair of bead humps, one hump being adjacent each bead seat and one inclined surface extending between the reduced diameter central portion and the bead hump nearest the annular flange located adjacent the axially outboard side, the tire rim comprising one annular flange at either the axially outboard end or the axially inboard end having a maximum radial height (h) being less than 12 mm as measured from the bead seat and no portion of the rim flange extends radially above said height (h), wherein each annular flange has an axially innermost surface that is inclined radially and axially outwardly at an angle greater than 60° relative to the rim's axis.

7. A light truck or automobile tire and rim assembly, the rim having an axially inboard end and an axially outboard end having an annular flange at both axial ends, respectively, a pair of bead seats axially inwardly extending from the flanges, a reduced diameter central portion between the opposing bead seats, a pair of bead humps, one hump being adjacent each bead seat and one inclined surface extending between the reduced diameter central portion and the bead hump nearest the annular flange located adjacent the axially outboard side, the tire rim comprising one annular flange at either the axially outboard end or the axially inboard end having a maximum radial height (h) being less than 12 mm as measured from the bead seat and no portion of the rim flange extends radially above said height (h); and wherein the tire has a tread portion, a tread reinforcement in the tread portion, a pair of sidewalls respectively on opposite sides of the tread portion, a pair of beads respectively at the radially inner edges of the sidewalls, a bead core respectively in each of the beads, and a carcass reinforcement having cords that are radially extending, the tire having an aspect ratio of less than 65%, each bead core of the tire having a cross-sectional area having a centroid, the centroid being located radially less than 12 mm from the bead seat.

8. The light truck or automobile tire and rim assembly of claim 7 wherein each bead core has the centroid located radially at 9 mm or less from the bead seat.

9. The light truck or automobile tire and rim assembly of claim 7 wherein the at least one annular flange radial height (h) is in the range of 6 mm to less than 12 mm.

10. The light truck or automobile tire and rim assembly of claim 7 wherein the radial height (h) of the at least one annular flange is about 9 mm.

11. The light truck or automobile tire and rim assembly of claim 10 wherein the radial height (h) of the at least one annular flange is radially within 3 mm of the radial location of the centroid of the bead core.

12. The light truck or automobile tire and rim assembly of claim 7 wherein the bead core radial location of the centroid and the radial height (h) of the at least one annular flanges are within 1 mm.

13. The light truck or automobile tire and rim assembly of claim 7 wherein each annular flange has a maximum radial height of (h), (h) being less than 12 mm.

* * * * *